(12) United States Patent
Liu et al.

(10) Patent No.: US 11,182,148 B2
(45) Date of Patent: Nov. 23, 2021

(54) SYSTEM AND METHOD FOR AUTOMATED BIOS RECOVERY AFTER BIOS CORRUPTION

(71) Applicant: DELL PRODUCTS, LP, Round Rock, TX (US)

(72) Inventors: Wei Liu, Austin, TX (US); Po-Yu (Smith) Cheng, Tainan (TW)

(73) Assignee: Dell Products L.P., Round Rock, TX (US)

( * ) Notice: Subject to any disclaimer, the term of this patent is extended or adjusted under 35 U.S.C. 154(b) by 248 days.

(21) Appl. No.: 15/919,444

(22) Filed: Mar. 13, 2018

(65) Prior Publication Data
US 2019/0286436 A1    Sep. 19, 2019

(51) Int. Cl.
*G06F 8/654* (2018.01)
*G06F 9/4401* (2018.01)
*G06F 11/14* (2006.01)

(52) U.S. Cl.
CPC ............ *G06F 8/654* (2018.02); *G06F 9/4401* (2013.01); *G06F 11/1417* (2013.01)

(58) Field of Classification Search
None
See application file for complete search history.

(56) References Cited

U.S. PATENT DOCUMENTS

| | | | |
|---|---|---|---|
| 5,835,695 A * | 11/1998 | Noll ................... | G06F 11/1417 714/6.1 |
| 6,715,106 B1 * | 3/2004 | Mermelstein ....... | G06F 11/0751 713/2 |
| 8,943,302 B2 | 1/2015 | Ayanam et al. | |
| 9,542,195 B1 * | 1/2017 | Astarabadi .......... | G06F 11/1469 |
| 2007/0162735 A1 * | 7/2007 | Cho ....................... | G06F 9/4401 713/2 |
| 2010/0146159 A1 | 6/2010 | Lerman | |
| 2015/0095633 A1 * | 4/2015 | Yao ........................ | G06F 21/575 713/2 |
| 2016/0055069 A1 * | 2/2016 | Jeansonne ............. | G06F 3/0683 714/15 |
| 2016/0117225 A1 * | 4/2016 | Yu ....................... | G06F 11/1417 714/15 |
| 2018/0039546 A1 * | 2/2018 | Lambert .............. | G06F 11/1417 |
| 2019/0065210 A1 * | 2/2019 | Han ...................... | G06F 9/4401 |
| 2019/0163497 A1 * | 5/2019 | Samuel ................. | G06F 9/4411 |

* cited by examiner

*Primary Examiner* — Bryce P Bonzo
*Assistant Examiner* — Michael Xu
(74) *Attorney, Agent, or Firm* — Larson Newman, LLP

(57) ABSTRACT

A method includes determining that initial boot block (IBB) firmware at an information handling system is invalid. The method further includes identifying that a redundant copy of the IBB firmware is stored at the information handling system, and executing the redundant copy of the IBB firmware.

15 Claims, 5 Drawing Sheets

SYSTEM AND METHOD FOR AUTOMATED BIOS RECOVERY AFTER BIOS CORRUPTION

FIELD OF THE DISCLOSURE

This disclosure generally relates to information handling systems, and more particularly relates to automated BIOS recovery after BIOS corruption.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A unified extensible firmware interface (UEFI) can provide an interface between the hardware and firmware of the information handling system and an operating environment of the information handling system.

SUMMARY

A method may include determining that initial boot block (IBB) firmware at an information handling system is invalid. The method may further include identifying that a redundant copy of the IBB firmware is stored at the information handling system, and executing the redundant copy of the IBB firmware.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
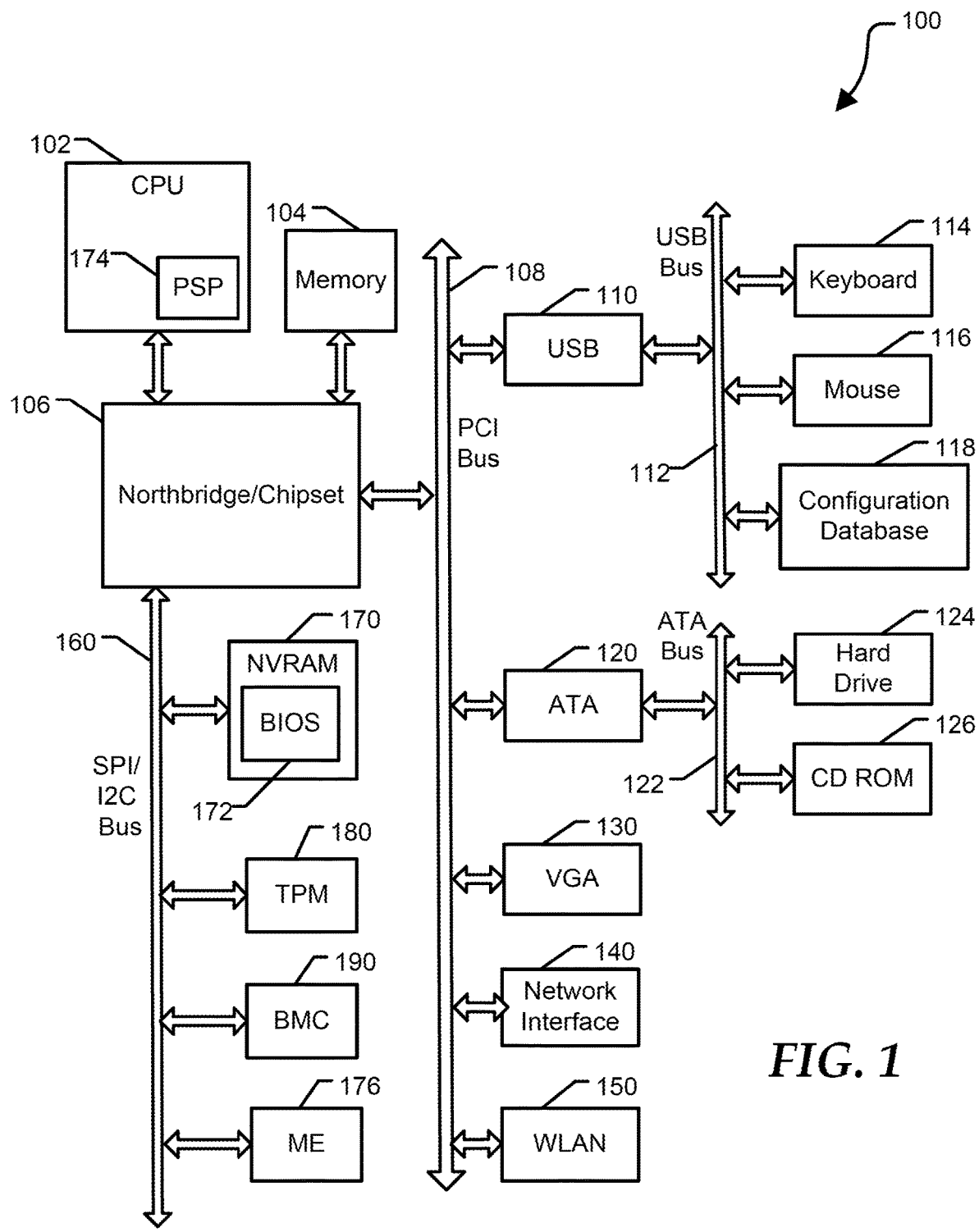
FIG. 1 is a block diagram of an information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Information handling systems typically utilize a collection of firmware that is configured to initialize individual subsystems and to ultimately launch an operating system. Firmware included at an information handling system is often referred to as a basic input/output system (BIOS). Today, much of the industry has incorporated a firmware architecture specification know as the Unified Extensible Firmware Interface (UEFI). While the UEFI specification has standardized many aspects of system initialization, the earliest steps in the hardware initialization process may be proprietary to individual equipment manufacturers and further specific to the particular manufacturer of the central processing unit (CPU). For example, the ubiquitous x86 processors provided by Intel Corporation and by Advanced Micro Devices (AMD) employ different early-initialization architectures.

Common to most firmware and system initialization architectures is the concept of root of trust. At a most general level, the root of trust relates to software processes and/or hardware devices that ensure that firmware and other software necessary for operation of an information handling system is operating as expected. A root of trust can be started by a variety of methods. The simplest mechanism is to run start-up code directly from a non-writable memory device. Alternatively, to allow updates and more flexibility, the code can be loaded from a protected memory region into a protected memory store of some sort set aside for firmware execution, among a number of other methods. The important aspect for a root of trust is to be sure that the initial code is what the manufacturer intended, before execution. When the information handling system starts, the root of trust can execute self-tests and code validation. If these tests pass, it can move on to validate the first piece of code in the chain of trust. While the UEFI specification provides various techniques for detecting and correcting some types of corruption, there are presently limitations to these techniques, especially with regard to the earliest stages of system initialization.

Firmware can become corrupted by malicious activities or as a result of an operation failure. For example, firmware at an information handling system can be corrupted if power provided to the system is not maintained during a firmware update procedure. If a portion of system firmware is corrupted, the information handling system may fail to become operational. If the corruption is the result of malicious activity, the system may appear operational but various security aspects of the system may be compromised. In either case, a complete or partial BIOS recovery procedure is likely required to replace the corrupted firmware with firmware that is not corrupted. FIGS. 1-5 illustrate techniques for providing redundant copies of specific firmware at the primary firmware memory device, and for utilizing the redundant firmware when a corresponding firmware module is determined to be invalid.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, a trusted platform module (TPM) 180, and a baseboard management controller (BMC) 190. BMC 190 can be referred to as a service processor. NVRAM 170 can be referred to as a SPI flash storage device, BIOS SPI, and the like. BMC 190 is configured to provide out-of-band access to devices at information handling system 100. As used herein, out-of-band access herein refers to operations performed without support of CPU 102, such as prior to execution of BIOS 172 by processor 102 to initialize operation of system 100. In an embodiment, system 100 can further include a platform security processor (PSP) 174 and/or a management engine (ME) 176. In particular, an x86 processor provided by AMD can include PSP 174, while ME 176 is typically associated with systems based on Intel x86 processors, and is provided on the system main board (also referred to as a mother board). As used herein, a platform security processor is a processor that can operate independently of primary CPU core processors, and that can execute firmware prior to the execution of the BIOS by a primary CPU core processor. Accordingly, PSP 174 incorporated at an AMD x86 CPU and ME 176 incorporated at an Intel x86 main board are both considered to be platform security processors for the purpose of the present disclosure. For clarity, techniques disclosed herein are described in the context of an AMD processor and associated architecture, however one of skill will appreciate that similar techniques can be utilized on systems based on other processors, such as processors provided by Intel Corporation.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS is herein used interchangeably with the term firmware image, or simply firmware. BIOS 172 includes instructions executable by CPU 102 and PSP 174 to initialize and test the hardware components of system 100, and to load a boot loader or an operating system (OS) from a mass storage device. BIOS 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

PSP 174 is a microcontroller that includes dedicated read-only memory (ROM) and static random access memory (SRAM). PSP 174 is an isolated processor that runs independently from the main CPU processor cores. PSP 174 has access to firmware stored at NVRAM 170. During the earliest stages of initialization of system 100, PSP 174 is configured to authenticate the first block of BIOS code stored at NVRAM 170 before releasing the x86 processor from reset. Accordingly, PSP 174 provides a hardware root of trust for system 100.

Figure 2:
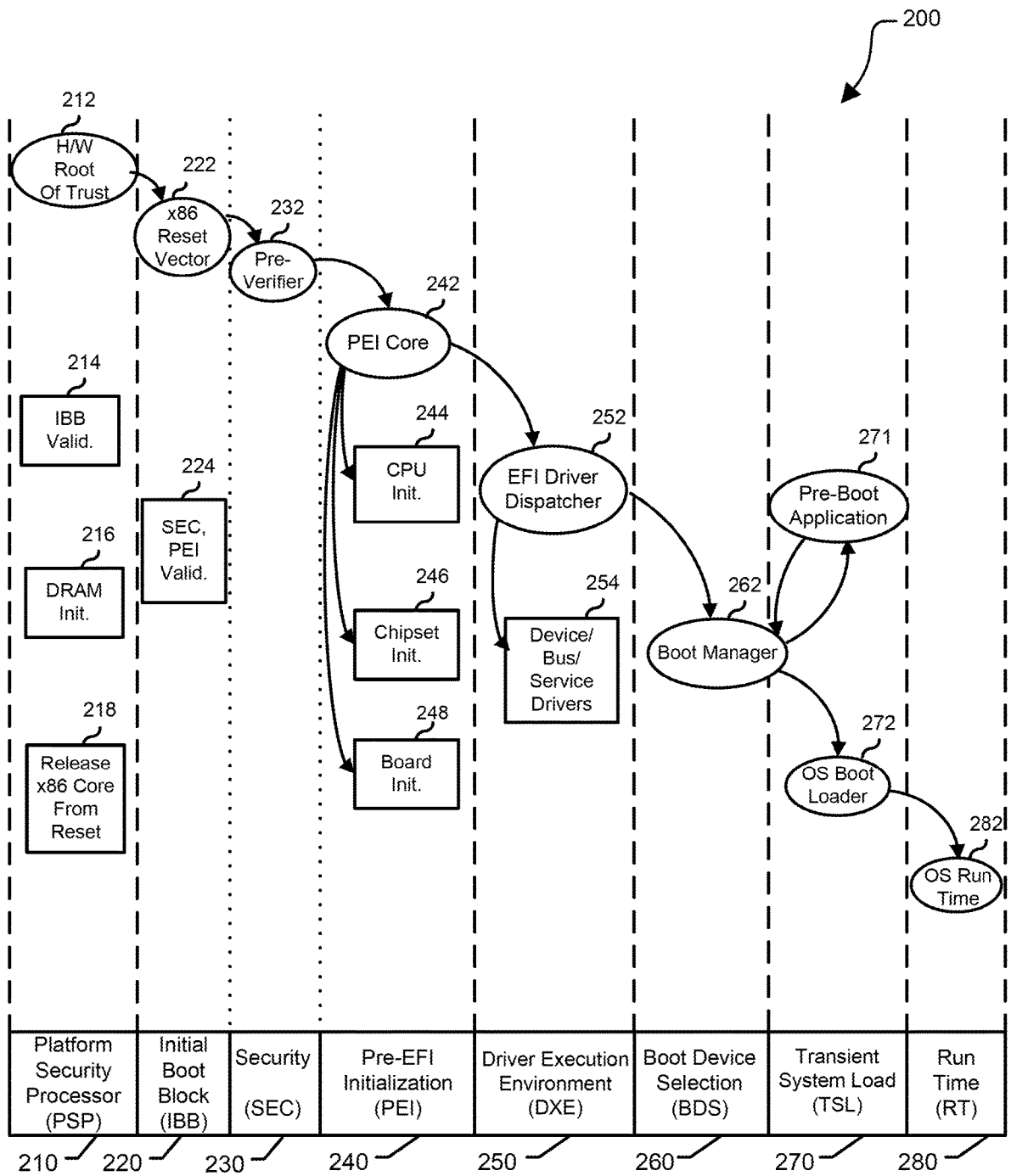
FIG. 2 is a phase diagram illustrating initialization of the information handling system of FIG. 1 according to a specific embodiment of the present disclosure.

FIG. 2 shows an initialization phase diagram 200 for an information handling system according to a specific embodiment of the present disclosure. Phase diagram 200 includes a PSP phase 210, an initial boot block (IBB) phase 220, a security phase (SEC) 230, a pre-EFI initialization phase (PEI) 240, a driver execution environment phase (DXE) 250, a boot device selection phase (BDS) 260, a transient system load phase (TSL) 270, and a run time phase (RT) 280. The number of stages of the boot process and specific operations that occur during these earliest stages of the boot process can vary from one equipment manufacturer to another. As described above, the use of a platform security processor, such as PSP 174, is associated with information handling systems based on x86 processors provided by AMD. PSP 174 includes a read-only memory (ROM) that includes instructions executable by PSP 174 to authenticate PSP firmware stored at a PSP directory at NVRAM 170. If the PSP firmware passes authentication, control is passed to the PSP firmware. Accordingly, PSP 174 provides a hardware root of trust. The PSP directory contains a public key provided by AMD, and a pointer to boot loader firmware, and the like. Because PSP 174 is integrated on the same die as the x86 core processors and memory controllers, initialization and accessibility of memory 104 is provided during PSP phase 210. The PSP firmware is configured to validate an IBB image stored at NVRAM 170 before releasing the x86 processor from reset.

IBB phase 220 corresponds to the first execution of BIOS 172 instructions by an x86 processor core included at CPU 102. In an embodiment, IBB phase 220 is responsible for validating BIOS instructions associated with SEC phase 230 and PEI phase 240. In other embodiments, functionality provided during the SEC 230 and PEI 240 phases can be included in IBB phase 220. SEC phase 230 is configured to set up a pre-verifier 232. Pre-verifier 232 can handle restart events on the information handling system, and temporarily may allocate a portion of memory for use during the other boot phases. In the case of information handling systems based on x86 processors provided by the Intel Corporation, SEC 230 passes execution to PEI 240 which initializes system memory 104 for information handling system 100. PEI 240 can include PEI core code 242, which oversees CPU initialization 244, chipset initialization 246, and board resource initialization 248. PEI 240 passes execution to DXE 250 which performs device specific initializations for the information handling system. In particular, DXE 250 executes an EFI driver dispatcher 252 that operates to load device, bus, and service drivers 254.

DXE 250 passes execution to BDS 260 and executes a boot manager 262 which identifies a boot target, and passes execution to TSL 270. TSL 270 can launch an OS boot loader 272, which loads the operating system and passes execution to the OS runtime environment 282 at RT 280. RT 280 can remain active until system 100 is reset, an Advanced Configuration and Power Interface (ACPI) event is initiated, and the like, at which time execution is passed to a phase of operation sometimes referred to as after life, which refers to times that the firmware takes control back from the primary OS, such as when system 100 enters a low-power mode of operation. Alternatively, TSL 270 can launch one or more pre-boot applications 271. Upon completion of the pre-boot application 271, boot manager 262 can initiate OS boot loader 272, which loads the primary operating system.

During the boot process, instructions executed during a particular phase of the boot process can validate firmware associated with one or more subsequent phases. In the event that a block of firmware fails authentication, some form of BIOS recovery can be initiated to replace invalid firmware with uncorrupted firmware. Today however, corruption of PSP firmware or IBB firmware stored at NVRAM 170 may prevent information handling system 100 from progressing further into the boot process. Accordingly, the techniques disclosed herein provide mechanisms to automatically recover when PSP or IBB firmware is identified during the boot process to be invalid. In particular, redundant copies of the PSP and IBB firmware are included at NVRAM 170, and if either of the primary copies of the PSP or IBB firmware fail authentication, the corresponding redundant copy can be utilized to continue the boot process of system 100.

Figure 3A:
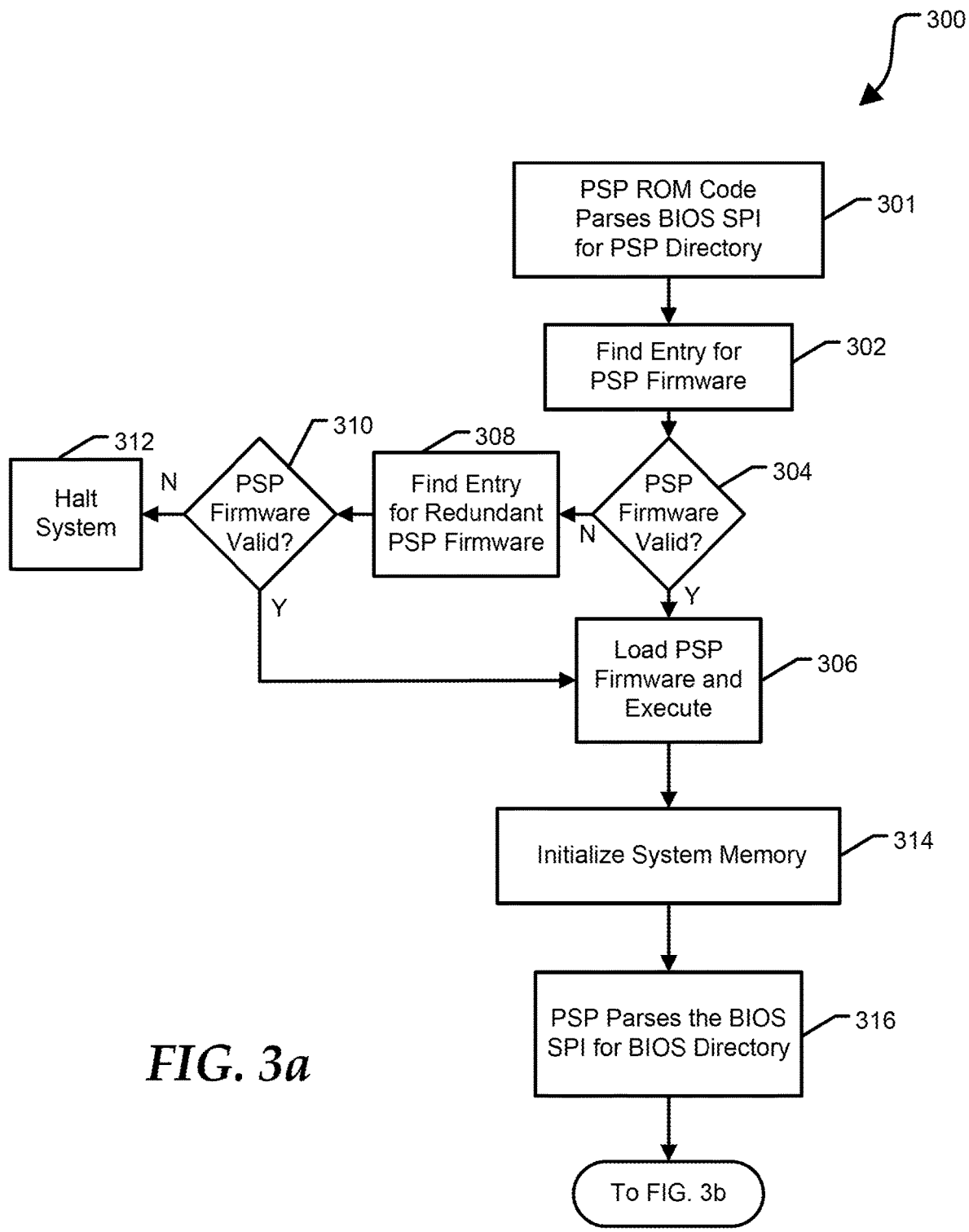
FIG. 3a and FIG. 3b are flow diagrams illustrating a method for automating BIOS recovery according to a specific embodiment of the present disclosure.
Figure 3B:
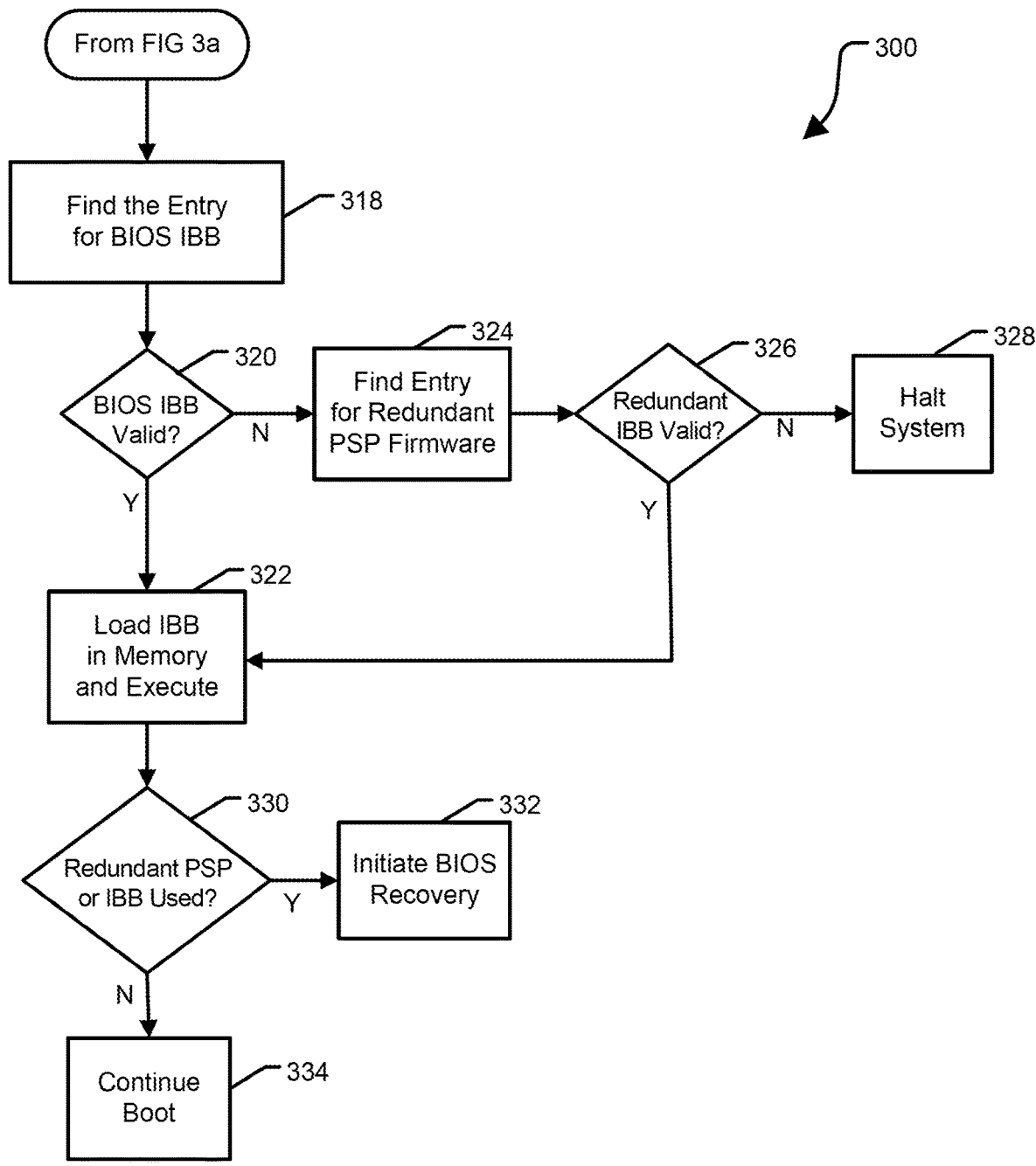

FIGS. 3a and 3b show a method 300 for automating BIOS recovery according to a specific embodiment of the present disclosure. Method 300 starts at block 301 where instructions stored at a PSP ROM and executed by the PSP are configured to parse the BIOS SPI to identify a PSP directory. For example, at the earliest stage of initialization of information handling system 100, PSP 174 can execute instructions stored at a ROM device included in the PSP subsystem (not shown at FIG. 1). The instructions are configured to access NVRAM 170 to identify a directory containing PSP firmware. Method 300 continues at block 302 where PSP firmware stored at the PSP directory is identified. At block 304, execution of instructions stored at the PSP ROM validates the PSP firmware stored at the BIOS SPI. If the PSP firmware is found to be valid, method 300 continues from decision block 304 to block 306 where the PSP firmware is loaded into memory and executed. If the PSP firmware is found to be invalid or otherwise fails authentication, method 300 proceeds to block 308 where a redundant copy of PSP firmware stored at the BIOS SPI is located and validated. If the redundant PSP firmware is also found to be invalid, method 300 terminates at block 312 where initialization of the system is halted. A flag indicating the initialization failure can be asserted at a register. Alternatively, if the redundant copy of the PSP firmware is verified to be correct, method 300 proceeds to block 306 where the PSP firmware is loaded into memory and executed.

Method 300 continues at block 314 where execution of the PSP firmware includes initialization of system memory. For example, a memory controller at CPU 102 can be initialized and memory 104 and associated data channels can be characterized to place memory 104 into operation. Execution of PSP firmware continues at block 316 where the PSP parses the BIOS SPI for a BIOS directory. Method 300 continues at block 318 at FIG. 3b, where an entry at the BIOS directory corresponding to the BIOS IBB is located and validated. If validation of the BIOS IBB is successful, method 300 proceeds from decision block 320 to block 322 where the IBB firmware is loaded into memory and executed. If the IBB firmware is found to be invalid, method 300 branches to block 324 where a redundant copy of IBB firmware is located and validated. If the redundant IBB is firmware is valid, method 300 proceeds to block 322 where the IBB firmware is loaded into memory and executed. If the redundant copy of the IBB firmware is also identified as invalid, method 300 terminates at block 328 where initialization of the system is halted. A flag indicating the initialization failure can be asserted at a register. Execution of IBB firmware can include initiating a BIOS recovery procedure in the event that one or both of the redundant PSP firmware or the redundant IBB firmware was utilized in the previous boot sequence. If a redundant copy of PSP or IBB firmware was executed, method 300 can proceed from decision block 330 to block 332 where a BIOS recovery procedure is initiated. If a redundant copy of PSP or IBB firmware was not utilized during the preceding initialization sequence, method 300 proceeds to block 334 where booting of the information handling system continues. For example, in an embodiment IBB firmware can validate firmware associated with the SEC and PEI phases before handing off control to SEC firmware.

As described above, one way that firmware can be corrupted and therefore fail validation is if power to information handling system 100 is interrupted during a firmware update procedure. For example, NVRAM 170 can be organized to include a plurality of sectors. A sector, as used herein, is a set of storage locations that are erased together. During a firmware update procedure, sectors are erased one sector at a time. An interruption of power during a sector erase or during a write operation can corrupt data that is stored at the sector. In a preferred embodiment, the redundant PSP firmware can be stored at a sector that is different than the sector containing the primary copy of the PSP firmware, and redundant IBB firmware can be stored at a sector that is different than the sector containing the primary copy of the IBB firmware. Accordingly, a corruption of data stored at NVRAM 170 caused by an interruption of power during an erase or write operation can not result in corruption of both the primary and the redundant copy of the PSP or IBB firmware.

Figure 4:
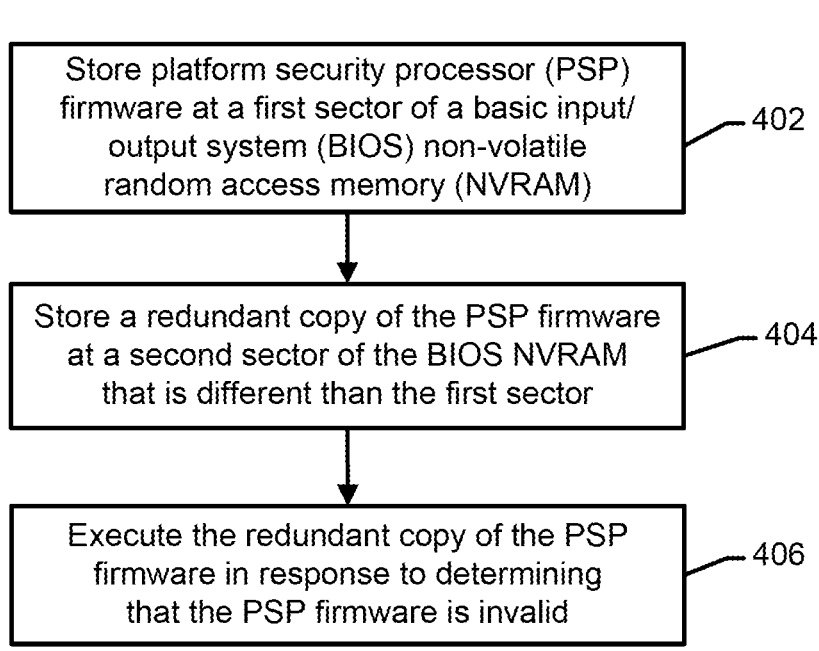
FIG. 4 is a flow diagram illustrating a method for storing a redundant copy of platform security processor firmware at a BIOS NVRAM according to a specific embodiment of the present disclosure.

FIG. 4 shows a method 400 for providing a redundant copy of PSP firmware at a BIOS NVRAM according to a specific embodiment of the present disclosure. Method 400 begins at block 402 where PSP firmware is stored at a BIOS NVRAM. For example, PSP 174 includes a ROM containing instructions to be executed by PSP 174. Additional firmware to be executed by PSP 174 is stored at NVRAM 170. Method 400 continues at block 404 where a redundant copy of the PSP firmware is stored at the BIOS NVRAM, the redundant copy stored at a sector of the BIOS NVRAM that is different than the sector storing the original PSP firmware. Method 400 completes at block 406 where the redundant copy of the PSP firmware is executed in response to determining that the original copy of the PSP firmware is invalid.

Figure 5:
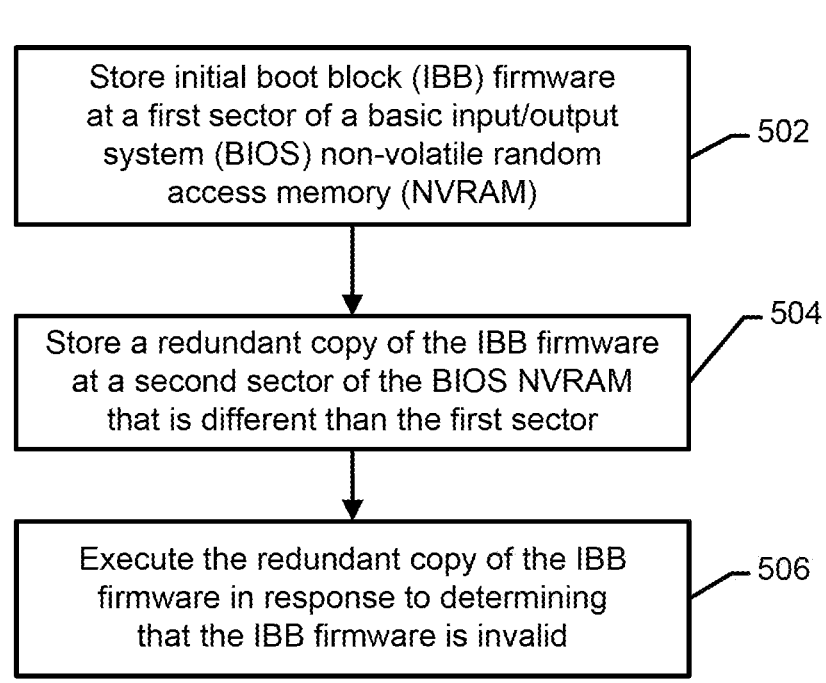
FIG. 5 is a flow diagram illustrating a method for storing a redundant copy of initial book block firmware at a BIOS NVRAM according to a another embodiment of the present disclosure.

FIG. 5 shows a method 500 for providing a redundant copy of IBB firmware at a BIOS NVRAM according to another embodiment of the present disclosure. Method 500 begins at block 502 where IBB firmware is stored at a BIOS NVRAM. For example, execution of PSP firmware completes by releasing an x86 core processor from reset, whereupon the x86 processor begins executing instructions residing at the initial boot block. Method 500 continues at block 504 where a redundant copy of the IBB firmware is stored at the BIOS NVRAM, the redundant copy stored at a sector of the BIOS NVRAM that is different than the sector storing the original IBB firmware. Method 500 completes at block 506 where the redundant copy of the IBB firmware is executed in response to determining that the original copy of the IBB firmware is invalid.

The techniques disclosed herein improve operation of information handling system 100 by allowing system 100 to complete initialization and to successfully launch an operating system even if a primary copy of either PSP or IBB firmware is corrupted. Furthermore, storing redundant copies of firmware at a sector of NVRAM 170 that is different than the sector storing the corresponding original firmware can prevent both the original firmware and the redundant firmware from being corrupted during a firmware update procedure. The disclosed techniques have been described in the context of PSP firmware and IBB firmware, and further in the context of an initialization architecture promulgated by AMD. However, one of skill will appreciate that these techniques are applicable to other firmware modules and other processor architectures.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
    executing, by a platform security processor operating in an information handling system, in response to an application of electrical power, a single boot-up procedure performing an automated verification of a basic input/output system (BIOS) firmware;
    identifying, by the platform security processor executing the single boot-up procedure, a non-volatile random access memory (NVRAM) storing a basic input/output system (BIOS) image, the BIOS image including: an initial boot block (IBB) including IBB instructions, the IBB instructions being instructions of the BIOS image first executed by an x86 central processing unit during initialization of the information handling system, the IBB stored at a first sector of the NVRAM, a sector being a unit of storage erased during an NVRAM erase operation; and
        second instructions executed during a pre-Extensible Firmware Interface (PEI) phase of the initialization, the second instructions validated by the IBB instructions;
    determining, by the platform security processor executing the single boot-up procedure, that an interruption of the electrical power corrupted the IBB stored at the first sector of the NVRAM by failing the automated verification executed during the single boot-up procedure;
    in response to the interruption of the electrical power corrupting the IBB stored at the first sector of the NVRAM, identifying, by the platform security processor during the executing of the single boot-up procedure, a redundant copy of the IBB is stored at a second sector of the NVRAM, the second sector different than the first sector; and
    continuing executing the single boot-up procedure using the redundant copy of the IBB identified by the platform security processor.

2. The method of claim 1, further comprising automatically releasing the redundant copy of the IBB.

3. The method of claim 1, further comprising determining, by the platform security processor executing the single boot-up procedure, that the redundant copy of the IBB is valid by passing the automated verification.

4. The method of claim 1, wherein in response to the platform security processor determining the portion of the IBB is invalid, further comprising setting a flag.

5. The method of claim 1, further comprising determining a block associated with the IBB fails the automated verification executed by the platform security processor.

6. The method of claim 1, further comprising loading the redundant copy of the IBB.

7. The method of claim 1, further comprising validating the redundant copy of the IBB.

8. The method of claim 1, further comprising launching an operating system after completing the single boot-up procedure using the redundant copy of the IBB.

9. An information handling system comprising:
    a central processing unit;
    a system memory;
    a non-volatile random access memory (NVRAM) to store a basic input/output system (BIOS) image, the BIOS image including:
        platform security processor (PSP) firmware, the PSP firmware stored at a first sector of the NVRAM, a sector being a unit of storage erased during an NVRAM erase operation;
        an initial boot block (IBB) including IBB instructions, the IBB instructions being instructions of the BIOS image first executed by an x86 central processing unit during initialization of the information handling system, the IBB validated during the initialization by the PSP firmware; and
        second instructions executed during a pre-Extensible Firmware Interface (PEI) phase of the initialization, the second instructions validated by the IBB instructions; and a PSP to execute instructions to:
  initiate a single boot-up procedure;
  execute, during the single boot-up procedure, a software validation of the PSP firmware;
  determine, during the single boot-up procedure, that an electrical power interruption corrupted the PSP firmware;
  in response to the electrical power interruption corrupting the PSP firmware, identify a redundant copy of the PSP firmware stored at a second sector of the BIOS NVRAM, the second sector different than the first sector; and
  continue executing, using the redundant copy of the PSP firmware, the single boot-up procedure.

10. The system of claim 9, wherein the PSP is further configured to:
  determine, during the single boot-up procedure, that the IBB is invalid;
  identify, during the single boot-up procedure, a redundant copy of the IBB is stored at the information handling system; and
  execute, during the single boot-up procedure, the redundant copy of the IBB.

11. The system of claim 10, further comprising:
  in response to executing the redundant copy of the IBB, performing a BIOS recovery procedure, during the single boot-up procedure, to update firmware stored at the BIOS NVRAM.

12. The system of claim 9, wherein the PSP firmware is invalid due to corruption occurring during a firmware update procedure at the BIOS NVRAM.

13. The system of claim 9, further comprising:
  in response to executing the redundant copy of the PSP firmware, performing a BIOS recovery procedure to update firmware stored at the BIOS NVRAM.

14. The system of claim 9, further comprising:
  in response to executing the redundant copy of the PSP firmware, setting a flag at a register identifying that the redundant copy of the PSP firmware was executed.

15. A method comprising:
  storing, by a platform security processor operating in an information handling system, an initial boot block (IBB) at a basic input/output system (BIOS) non-volatile random access memory (NVRAM), the IBB including instructions first executed by an x86 central processing unit during initialization of the information handling system to validate second instructions executed during a pre-Extensible Firmware Interface (PEI) phase of the initialization, the IBB stored at sectors of the NVRAM, each sector of the sectors being a unit of storage erased during an NVRAM erase operation;
  storing a redundant copy of the IBB at different sectors of the BIOS NVRAM that are different from the sectors storing the IBB; and
  executing, a single bootup procedure using the IBB;
  determining during the single boot-up procedure, that an electrical power failure corrupted the IBB using a software validation; and
  in response to the determining that the electrical power failure corrupted the IBB, continuing executing the single boot-up procedure using the redundant copy of the IBB stored at the different sectors.

* * * * *